US012190723B2

(12) United States Patent
Nguyen

(10) Patent No.: US 12,190,723 B2
(45) Date of Patent: Jan. 7, 2025

(54) CONNECTED ROADSIDE TRAFFIC DETECTION AND CONTROL SYSTEM

(71) Applicant: THRUGREEN, LLC, Falls Church, VA (US)

(72) Inventor: David H Nguyen, Southbridge, VA (US)

(73) Assignee: THRUGREEN, LLC, Falls Church, VA (US)

( * ) Notice: Subject to any disclaimer, the term of this patent is extended or adjusted under 35 U.S.C. 154(b) by 92 days.

(21) Appl. No.: 18/064,619

(22) Filed: Dec. 12, 2022

(65) Prior Publication Data

US 2023/0186765 A1 Jun. 15, 2023

Related U.S. Application Data

(60) Provisional application No. 63/288,225, filed on Dec. 10, 2021.

(51) Int. Cl.

| | |
|---|---|
| ***G08G 1/087*** | (2006.01) |
| ***G08G 1/01*** | (2006.01) |
| ***G08G 1/083*** | (2006.01) |

(52) U.S. Cl.

CPC ........... *G08G 1/087* (2013.01); *G08G 1/0116* (2013.01); *G08G 1/083* (2013.01)

(58) Field of Classification Search

CPC ....... G08G 1/087; G08G 1/0116; G08G 1/083

See application file for complete search history.

(56) References Cited

U.S. PATENT DOCUMENTS

| | | | | |
|---|---|---|---|---|
| 9,711,045 | B1 * | 7/2017 | Worthy | G08G 1/087 |
| 11,030,895 | B1 * | 6/2021 | Kulus | G08G 1/08 |
| 11,202,302 | B2 * | 12/2021 | Cross | G08G 1/087 |
| 2018/0293890 | A1 * | 10/2018 | Bernhardt | G08G 1/0965 |
| 2019/0287396 | A1 * | 9/2019 | Sayin | G08G 1/07 |
| 2020/0168007 | A1 * | 5/2020 | Kuramochi | G06Q 20/405 |
| 2020/0242922 | A1 * | 7/2020 | Dulberg | G01S 5/06 |
| 2021/0327265 | A1 * | 10/2021 | Schulte | H04W 4/44 |

* cited by examiner

*Primary Examiner* — Andrew W Bee

(74) *Attorney, Agent, or Firm* — Laubscher & Fretwll, P.C.

(57) ABSTRACT

A system for prioritizing traffic having a traffic signal controller (TSC), a processor, a database, and one or more detectors configured to detect the presence of a vehicle having a vehicle identifier. The system is configured so that the processor is in communication with the TSC and at least one detector, and the detectors are configured to detect passing vehicles having a vehicle identifier. In a case the vehicle identifier has a record within the database, the processor an approximate travel time of the vehicle identifier between a location of the detector where the vehicle identifier is detected and a traffic signal connected to the TSC, and a command is set to be sent from the processor to the TSC to change the traffic signal connected to the TSC in a direction of travel of the vehicle identifier if one or more conditions are met. The command sent from the processor to the TSC has a delay of between zero seconds and the approximate travel time calculated.

9 Claims, 1 Drawing Sheet

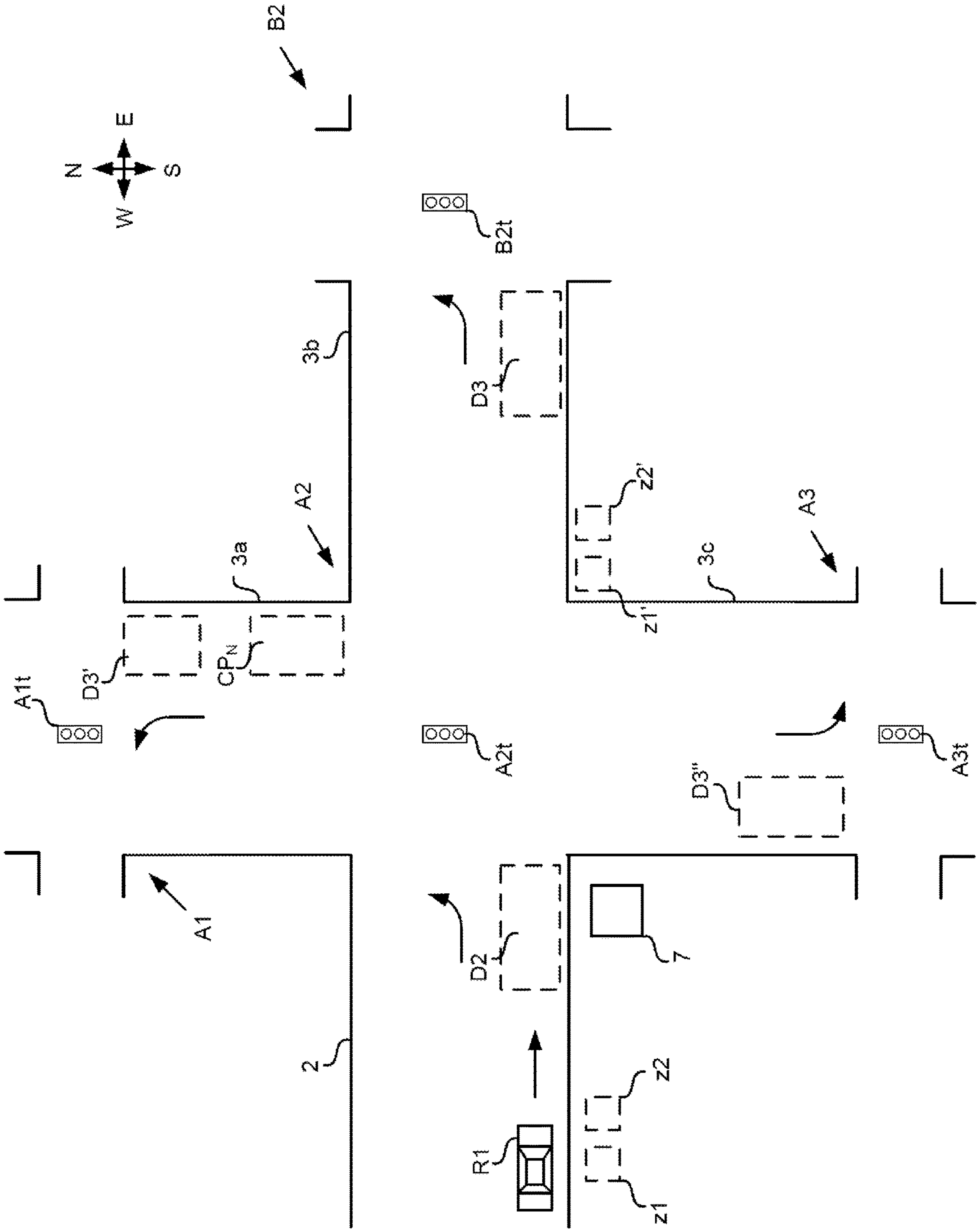
B2
E
N
S
W
B2t
3b
D3
z2'
A2
3a
A3
3c
z1'
D3'
$CP_N$
A1t
A2t
A3t
D3''
A1
D2
7
2
z2
R1
z1

CONNECTED ROADSIDE TRAFFIC DETECTION AND CONTROL SYSTEM

This application claims benefit of U.S. non-provisional applications PCT/US17/67350, PCT/US20/46496, PCT/US19/28440 and provisional applications 62/660,940, 62/765,280, 62/922,517 and 62/974,826, the contents of which are incorporated herein in their entirety.

BACKGROUND

Field of the Disclosure

The present disclosure is directed to a connected roadside traffic detection and control system.

Description of the Related Art

Vehicle traffic congestion is a major problem worldwide with costs estimated in the hundreds of billions of dollars per year in the United States alone. While there are many causes of traffic congestion, one of the major causes is traffic signal control systems operating with limited information with respect to the road and traffic conditions, and therefore unable to accurately match traffic signal operations with actual traffic movements of vehicles, bicyclists, and pedestrians.

Congestion can arise in cases where more vehicles are waiting in a queue at a junction for a traffic signal to change from displaying a red light to displaying a green light, and the period the traffic signal is green does not allow all the vehicles waiting in the queue to pass through the junction. Another case where congestion may arise in a similar scenario is if the traffic signal does remain green to otherwise clear the waiting queue of vehicles but a road ahead of the queue of vehicles is congested with other vehicles, the queue of vehicles still cannot proceed through the junction. One cause of traffic congestion and delay is poor signal timing and limited traffic detection, resulting in non-optimal situations where traffic signal operations do not match actual traffic demands due to limited communication and traffic detection capabilities.

SUMMARY

The present disclosure is directed to a system for sending a call signal to a traffic signal controller using a traffic detection device, the traffic detection device configured to detect an identifier affixed to a passing vehicle, and the system having a processor to relate the identifier and vehicle to a database record containing information including one or more identity and/or payment information of the vehicle. The processor is configured to compare and determine if and when to send the call signal to the traffic signal controller. The call signal is for prompting an action of the traffic signal controller to provide a green light signal in a direction of travel for the vehicle detected or identified. The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein:

FIG. 1 illustrates an area having a number of signalized four way junctions and road segments, according to one example.

DETAILED DESCRIPTION OF THE EMBODIMENTS

In the drawings, like reference numerals designate identical or corresponding parts throughout the several views. Further, as used herein, the words “a”, “an” and the like generally carry the meaning of “one or more”, unless stated otherwise. Referring now to the drawings, wherein like reference numerals designate identical or corresponding parts throughout the several views.

FIG. 1 illustrates an area having a number of signalized four way junctions and road segments, according to one example. The area may have a junction A1, a junction A2, a junction A3 and a junction B2. Each junction may have a number of traffic signals to control traffic in each of the directions of the junction.

The junction A1 may have a road segment 3*a* shown as an approach from the south. The junction A2 may have a road segment 2 approaching from the west, the road segment 3*a* approaching from the north, a road segment 3*b* approaching from the east, and a road segment 3*c* approaching from the south. The junction A3 may have the road segment 3*c* shown as an approach from the north. The junction B2 may have the road segment 3*b* shown as an approach from the west.

Each junction may have traffic signals in each direction, represented in FIG. 1 by a traffic signal in the middle of the junction. For example, the junction A1 may have traffic signals A1*t* in each direction of the junction, the junction A2 may have traffic signals A2*t*, the junction A3 may have traffic signals A3*t*, and the junction B2 may have traffic signals B2*t*.

Traffic signals may be controlled locally at a junction by a traffic signal controller (TSC) 7 which may be responsive to inputs or “calls” from detectors connected to the TSC 7. Detectors may be connected to the TSC 7 by being directly wired to the TSC 7 or traffic cabinet within which the TSC 7 is located, or remotely via a wireless or network connection. Further, the area may have geofences such as those indicated by geofences D2, D3, D3' and D3", to detect traffic using a GPS based navigation or detection system.

In one example, a detector Z1 may be located roadside or above the road on the road segment 2 to monitor traffic traveling in an eastbound direction. The detector may be equipped with a capability to read RFID tags, QR codes, UPCs, or other signals obtained from a passing vehicle. A vehicle R1 may be traveling eastbound on the road segment 2 toward the junction A2.

The vehicle R1 may be detected by the detector Z1 as it passes within range of the detector Z1 to read a sensor affixed to the vehicle R1. Location and placement of the detector Z1 may indicate to the system the direction of travel of the vehicle R1, and possibly the speed.

In another example, there may also be a second detector Z2' located on the road segment 2 subsequent to the first detector Z1 in the eastbound direction.

Further, the vehicle R1 may also be detected by the second detector Z2. In a case both the first detector Z1 and the second detector Z2 detect the vehicle R1, the direction of travel and the speed of the vehicle R1 may be determined if the system is calibrated based on knowing the placement of and the distance between the first and the second detectors.

In another case, the second detector Z2 (or its range of detection) may be located further away from the first detector Z1, such as on the order of more than a foot away along the road and/or across a junction from the first detector Z1, such as indicated by a second detector Z2'.

If the detector Z2' is on a different side of the junction A2 from the detector Z1, or far enough away from the detector Z1 then a travel time may be determined for the distance between the two detectors Z1 and Z2'. During a time period that the vehicle R1 is detected between the two detectors Z1 and Z2' then an average speed between the two points may be calculated. If that average speed is below the posted speed limit and the signal status of the traffic signals A2*t* in the direction of travel on the road segments 2 and 3*b* between the detectors Z1 and Z2', and the signal status of the traffic signals A2*t* is known to be green in that direction of travel then there is a probability that the road segment between the detectors is experiencing congestion or some kind of unexpected delay or the vehicle R1 pulled off the road. Comparing the travel time of the vehicle R1 between the two detectors Z1 and Z2' with such data obtained concurrently about the travel times of other vehicles detected between the detectors Z1 and Z2' would increase the degree of confidence in determining if there is a delay between the detectors.

Directional Indicator

Can calculate speed, though not as instantaneous as two (or two detection areas) that are in close proximity, for example, within a distance of approximately one meter of each other or less.

A vehicle identifier 17 may be a sensor or tag affixed to a vehicle. In one example, the identifier 17 is an RFID sensor. The RFID sensor may be a toll tag, parking pass, vehicle registration or inspection indicator, or a unique sensor for the purpose of traffic detection. In another example, the identifier 17 is a license plate. In another example, the identifier 17 is a label having a UPC or QR code. In another example, the identifier 17 is a wireless signaling or Bluetooth equipped device. Further, more than one sensor or identifier 17 may be affixed to the vehicle as separate, independent units, or some of the sensors may be combined into one. For example, the license plate may also be equipped with an RFID sensor, a wireless signaling or Bluetooth device, and/or a UPC or QR code.

Placement and quantity of detectors may allow for detection of vehicle counts, directions and speeds. A mid-block placement may be considered for detection of free flow traffic, as vehicular traffic detected there may not be affected by the status of traffic signals as much as for detector placement locations that are at or near a junction, such as within approximately 200 feet of the junction (depending on the type of junction and the volume of traffic).

A distance from a first signalized junction to a second signalized junction or detector may influence travel time and variability of travel time measured between two locations.

If close to the junction, such as the junction A2 such that

Other factors of a road segment or an approach that may influence travel time include a prevailing speed limit, time of day, weather conditions, traffic conditions, and if there is an event, whether planned or unplanned, that may impact traffic volumes and speeds. Planned events may be scheduled road work, construction or gatherings while unplanned events may generally be the result of accidents or other unanticipated driving behaviors.

A time needed to change a display sign or traffic signal may be a significant factor as well. In one example, a sum of a yellow light time and a red clearance time needed to change to a green light direction of a signalized intersection may be on the order of 3 to 12 seconds or more.

Once a vehicle is detected any available information may be used to determine the next action if any, that may be taken by the system.

The vehicle R1 may be considered anonymous if only a presence, heading and/or a speed of the vehicle may be determined but no other specific identifiable information about it is obtained by the detectors Z1 and Z2. It may not be possible to identify the specific vehicle R1 again.

The vehicle R1 may be considered identifiable if a presence, heading and/or a speed of the vehicle may be determined, along with data that can be used to cross reference the vehicle R1 with the same vehicle R1, or the device or sensor again, such as a license plate reading, a vehicle registration, a device MAC address, or a toll tag but no other specific identifiable information about may be obtained by the detectors Z1 and Z2.

In other words, the same vehicle R1, sensor or identifier 17 may be identified again at another time and location. But that identity may not be sufficient for the system to communicate or transact with the vehicle R1. For example, a toll tag may be read by the detector Z1 and the detector Z2 with the same outcome, and it can be concluded that the same identifier 17 was located at two different times and locations. But if this identifier 17 is not associated with any account information then only the identifier 17 (e.g. a toll tag) is identifiable, and not more unless there is additional information available related to that identifier 17.

The vehicle R1 may be considered active if a presence, heading and/or a speed of the vehicle may be determined, along with other data that can be used to cross reference the vehicle R1 with a specific vehicle, device or sensor, such as a license plate reading, a vehicle registration, a device MAC address, or a toll tag and an account or software application that can communicate or transact with the system.

In one example, the system immediately puts in a traffic detection call to request a green traffic light in the direction of travel of the vehicle R1.

In one example, the system immediately puts in a traffic detection call to request a green traffic light (or other traffic phase) in a conflicting direction of travel of the vehicle R1 in order to effect a red light signal for the vehicle R1. In another example, the system puts in a traffic detection call after a predefined or calculated delay from a time of detection to request a green traffic light in the direction of travel of the vehicle R1.

In another example, Expected Value (EV) or cumulative EV of two or more approaches of a junction may be compared over one or more current and upcoming time periods. If the vehicle R1 is identifiable and has a known priority level then the EV or cumulative EV of the approach of that detector may be increased by an amount equal to that of the vehicle R1 for the comparison period. The system may then put in a detector call to the TSC 7 for the direction with the highest EV or cumulative EV to effect a green light for the approach or direction through the junction A2 for that direction.

In one example, the vehicle R1 is traveling on the road segment 2 and detected by the detector Z1 and/or the detector Z2 as the vehicle travels toward the junction A2. In one case, the system may then deterministically place a detection call with a TSC 7 that controls the traffic signals A2*t* at the junction A2 for the direction of travel of the vehicle R1.

In other cases, the system may conditionally determine whether to take an action, such as to place a detection call to a TSC 7, and if so, when to place the detection call. Calls may be placed without delay or after a particular time delay.

In one case, the system may use a probability to determine whether to place the detection call to the TSC 7 that controls the traffic signals A2*t* at the junction A2 for the vehicle R1 once the vehicle R1 is detected by the detector Z1 and/or the detector Z2. The probability may be a function of the past travel times of a vehicle type or for a specific vehicle R1. For example, a passenger car detected by the detector Z1 and/or the detector Z2 while traveling eastbound on the road segment 2 may have an 85% probability of arriving at the junction A2 in between 10 and 15 seconds (EV=0.85). Thus the system may place a detection call to the TSC 7 for the junction A2.

Further, if the system can determine that the identifier 17 of the vehicle R1 has previously traveled between the detector Z1 and the detector Z1' (or Z2') then the vehicle R1 may be assigned an EV for that location and conditions based on its own past record, such as one or more previous travel times of the vehicle R1 between the detectors Z1 and Z1'.

In another case, the vehicle R1 is detected to be traveling above a threshold speed toward the junction A2, or the vehicle R1 is identified by the system as having a record within a database, and the system does not place a detection call with the TSC 7 that controls the traffic signals A2*t* at the junction A2 for the direction of travel of the vehicle R1. Further, the system may place a detection call to actively prevent the vehicle R1 from receiving a green light signal in its direction of travel at the junction A2, such as to reduce average speeds or the incidence of speeding.

Further, the system may send an alert or notify certain parties, such as law enforcement, emergency responders or roadside assistance dispatchers, that a vehicle detected by the system may need assistance or attention if any of the vehicle's identifier 17*s* matches that of a record located within a database connected to the system. The alert may include a time, location, an identifier 17 or description of the vehicle detected, and/or a reason for the alert. Cases that may merit the system alerting certain parties to vehicles matching database records that need attention include those related to criminal activity, missing or wanted persons, or missing property.

In another example, the vehicle R1 is an emergency response vehicle such as an ambulance, fire truck, police vehicle or that of another first responder, traveling in an emergency mode on the road segment 2 toward the junction A2.

The system may be used for emergency vehicle preemption (EVP) to provide the vehicle R1 with a level of green light priority higher than that of other motor vehicles. If the detector Z1 detects the vehicle R1 as the vehicle passes, the system may send a detector call to the TSC 7 to request a preemption call for a green light at the traffic signal A2*t* corresponding to a direction of travel of the vehicle R1.

Further, the system may also send a detector call to a second TSC 7, such as one for the junction B2 to request a preemption call for a green light at the traffic signal B2*t* corresponding to a direction of travel of the vehicle R1. The system may send the detector call to the second TSC 7 at the same time as to the first TSC 7, or send the call to the second TSC 7 after a time delay, such as relative to the location of the second TSC 7 relative to the location where the vehicle R1 was detected by the detector Z1.

The system may cross reference with a database table of vehicles that are operating in an emergency response mode. If the identifier 17 of the detected vehicle R1 is contained within the current reference database table then the system may send a detector call to the TSC 7 at the traffic signal A2*t* to request a preemption call for the direction of travel of the vehicle R1.

The current reference database table may also include a set of signalized junctions where the vehicle R1 may be provided with EVP, such as those along a route from a location of the vehicle R1 to its intended destination or those junctions located within a certain area. EVP access to those junctions for the vehicle R1 may also be limited to a time period, such as up to an upcoming period of 5, 10 or 30 minutes.

In another example, the vehicle R1 is a transit bus traveling on the road segment 2 toward the junction A2. The system may be used for providing Transit Signal Priority (TSP) for the vehicle R1 with a level of green light priority higher than that of other motor vehicles, except for emergency response vehicles (if any), while the vehicle R1 is in service.

If the detector Z1 detects the vehicle R1 as the vehicle passes, the system may send a detector call to the TSC 7 to request a priority call for a green light at the traffic signal A2*t* corresponding to a known direction of travel of the vehicle R1.

Further, the system may also send a detector call to a second TSC 7, such as one for the junction B2 to request a priority call for a green light at the traffic signal B2*t* corresponding to a known direction of travel of the vehicle R1. The system may send the detector call to the second TSC 7 at the same time as to the first TSC 7, or send the call to the second TSC 7 after a time delay, such as based on a location of the second TSC 7 relative to the location where the vehicle R1 was detected by the detector Z1.

Additionally, the system may withhold sending the detector call to either the TSC 7 at the first junction A2 and/or the TSC 7 at the second junction if certain conditions are met or are not met. Conditions may include if the vehicle R1 is known to be operating ahead of a schedule, the vehicle is stopping at a near-side bus stop relative to the location of the next junction, bus occupancy is below a certain level (an indicator of passengers on-board), whether traffic in other directions approaching the junctions A2 or B2 are presently close to or higher priority than that of the direction of approach of the vehicle R1. Priority of traffic in various approaches of a junction may be in the form of an Expected Value (EV) of one or more vehicles approaching the junction during upcoming periods of time.

In another example, the vehicle R1 may be scheduled to make stops along an eastbound direction of the road segment 2 and the road segment 3*b*, or may otherwise be delayed. The information may be in the form of an anticipated travel time (or time range) between two locations. The estimated travel time and route may be provided to the system in advance of the vehicle R1 traveling the route. In a case the estimated travel time on the road segment 2 and/or road segment 3*b* is greater than that for average traffic at that time, and the detector Z1 is located prior to a location of a scheduled stop (i.e. westbound of a location of a scheduled stop) of the vehicle R1, the system may delay placing a detector call with the TSC 7 at the junction A2 once the vehicle R1 is detected by the detector Z1 so as to match the anticipated arrival time of the vehicle R1 at the junction A2 with a green light signal status in the direction of travel of the vehicle R1.

In another example, the vehicle R1 is operating on a Vehicle Miles Traveled (VMT) plan. The system may log every time the vehicle R1 is detected by a detector in an area, such as at the detectors Z1 and Z2', record that to a database record. A distance the vehicle R1 is driven within the area may be calculated to arrive at an amount of VMT for the vehicle R1 during a time period, such as a week, a month, a quarter or a year.

Further, if the cumulative VMT for the vehicle R1 for the time period meets a criterion, the system may take an action. In one case, if the VMT for the vehicle R1 has not reached a maximum limit then the vehicle R1 may be provided with higher priority green light detection requests each time it is detected by a detector or certain detectors, such as by increasing the vehicle's EV. In another case, if the VMT for the vehicle R1 has reached a minimum threshold then the vehicle R1 may not be provided with higher priority green light detection requests.

An active identifier 17 of the vehicle R1 may conduct transactions using an account or software application. In one example, the vehicle R1 passes the detector Z1. The system may recognize the identifier 17 of the vehicle R1 in a database and debit or credit an account or payment method associated with the vehicle R1. In one case, a user may select a payment method and amount in exchange for a priority level for the vehicle R1 for a trip or portion of a trip along a route. The route may be defined by the user through use of a navigation system that defines the route, or may include any signalized junctions the vehicle R1 may be known to approach or pass through, or a subset of those signalized junctions as defined by the jurisdiction, the system or the user. The priority level may grant the identifier 17 of the vehicle R1 an increased EV for the duration of the term of the trip or portion of the trip.

In another case, the system may be set to automatically deduct a payment amount from the user account at a detector location or signalized junction according to various formulae, such that payment is only deducted from the user account if the system determines the vehicle R1 received a green light signal in its direction of travel through one or more signalized junctions.

In another case, the system may credit a payment amount to the user at a detector location or signalized junction according to various formulae, such that payment is made to the user account if the system determines the vehicle R1 did not receive a green light signal, or if another phase of the signalized junction was provided with a green light signal in exchange for payment from another party.

In another example, the system may serve to augment or supplement another vehicle location method or system operation, such as to reduce communication bandwidth and processing needed to communicate to the TSC of more than one junction, and/or increase the frequency and precision of vehicle location data. This may also serve as backup for cases where the other vehicle location method (e.g. GPS, cellular, etc.) requires communication between the vehicle and a remote processing location, and the connection is lost.

In one case, the vehicle R1 may be equipped with an identifier 17, such as an RFID tag, and a GPS transponder. The GPS transponder may periodically communicate its location to the system cloud computing environment, such as once every 10 to 30 seconds. At between 30 and 60 mph that may be between 440 and 2,640 feet, respectively, between readings.

Detectors located along a corridor or route of the vehicle R1 may be able to detect the vehicle R1 as it passes and provide that data to the system, effectively increasing the average rate at which the system receives vehicle location data for the vehicle R1 along the route. This may allow the system to make more precise decisions about when to send detection requests to one or more TSCs.

The identifier 17 may be detected by the detector Z1 as the vehicle R1 approaches the junction A2 on road segment 2. The system may use both sources of information to determine when to send a detector call to the TSC 7 at the traffic signal A2*t* for the direction of travel of the vehicle R1, further increasing the likelihood that the vehicle R1 receives a green light, shortens potential delay, or achieves some other desired outcome as it arrives at the junction A2.

A decision making process for the system may consider a number of aspects. Aspects that may be considered by the process of whether to put a detection call in from the detector Z1 to the TSC 7 may include whether the system is active. The system may be configured to operate 24 hours per day, seven days per week, it may be in operation part of the time may be temporarily out of service.

In a case the vehicle R1 is detected, the system may check with a database to determine if the identifier 17 is contained within the system. If not then the identifier 17 and a time stamp may be added to the database as a vehicle detected or as anonymous traffic detected at the location of a corresponding detector.

Further, the system may check if the vehicle R1 is eligible for a detection call to be placed for a particular traffic light signal status in a direction of travel of the vehicle R1 at one or more signalized junctions the vehicle R1 may be approaching.

If the vehicle R1 is eligible for the detection call to be placed, the system may check for what priority level the vehicle R1 may have (and therefore the priority level of the detection call). This may be partially tied into a payment status of the identifier 17. It may also be related to a volume or EV of approaching traffic in other directions of the junction the system is aware of or may have detected, both conflicting and concurrent traffic phases.

Further, if a detection call is to be placed the system may decide not to do it immediately, but rather to delay sending the call to a TSC for some amount of time to effect an intended outcome.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

What is claimed:

1. A system for prioritizing traffic at a junction of more than one approach, comprising a traffic signal controller (TSC), a processor, a database, and at least one of a detector and a geofence configured to detect the presence of a vehicle having a vehicle identifier;

wherein the at least one of the detector and the geofence determines a presence and passage of the vehicle identifier passing by the at least one of the detector and the geofence;

wherein the processor is in communication with the at least one of the detector and the geofence and the TSC, and uses data from the database and the at least one of the detector and the geofence to determine whether the vehicle identifier is known;

wherein the processor calculates an approximate travel time of the vehicle identifier between a location of the at least one of the detector and the geofence and a traffic signal connected to the TSC, and a command is set to be sent from the processor to the TSC to change the traffic signal connected to the TSC in a direction of travel of the vehicle identifier in a case a record of the vehicle identifier is contained within the database and the vehicle identifier presently has an Expected Value (EV) that exceeds a required threshold;

wherein at least a portion of the EV is a result of a pending transaction with an account associated with the vehicle identifier as the vehicle approaches the traffic signal;

wherein the command is set to be sent with a delay of between zero seconds and the approximate travel time, and the system monitors the traffic signal in the vehicle direction of travel during a time period from when the command is sent until after at least one of the approximate travel time and a detection of the vehicle identifier having passed through the junction to confirm the signal was at least one of a green and yellow signal for the vehicle as it passes the traffic signal; and in a case the signal is at least one of green and yellow until after the vehicle passes by the traffic signal then the pending transaction is completed.

2. The system of claim 1 wherein the required threshold the vehicle identifier EV must exceed includes at least one of an EV and a cumulative EV of an at least one conflicting approach direction of the junction during at least a portion of the approximate travel time.

3. The system of claim 1 wherein a further condition of the command to the TSC to change the traffic signal is only sent in a case a Vehicle Miles Traveled (VMT) condition of the vehicle is met.

4. The system of claim 1 wherein a further condition of the command to the TSC to change the traffic signal is only sent in a case the traffic signal is located at a junction that is on a route defined by a navigation system connected to and in use with the vehicle identifier.

5. The system of claim 1, wherein calculation of at least one of an estimated travel time and a direction includes use of at least one of a historical travel data and a real-time travel data of the vehicle identifier.

6. A method for prioritizing traffic at a junction of more than one approach comprising:

using a traffic signal controller (TSC), a processor, a database, and at least one of a detector and a geofence configured to detect the presence of a vehicle having a vehicle identifier;

further comprising the step of determining via at least one of the detector and the geofence a presence and passage of the vehicle identifier passing by the at least one of the detector and the geofence;

wherein the processor is in communication with the at least one detector and the TSC, and uses data from the database and the at least one detector and the geofence to determine whether the vehicle identifier is known;

calculating an approximate travel time of the vehicle identifier between a location of the at least one detector and the geofence and a traffic signal connected to the TSC;

setting a command to be sent to the TSC to change the traffic signal connected to the TSC in a direction of travel of the vehicle identifier in a case a record of the vehicle identifier is contained within the database and the vehicle identifier presently has an Expected Value (EV) that exceeds a required threshold;

wherein at least a portion of the EV is a result of a pending transaction with an account associated with the vehicle identifier as the vehicle approaches the traffic signal;

sending the command with a delay of between zero seconds and the approximate travel time, and monitoring the traffic signal in the vehicle direction of travel during a time period from when the command is sent until after at least one of the approximate travel time and a detection of the vehicle identifier has passed through the junction;

confirming the traffic signal was at least one of a green and yellow signal for the vehicle as it passes the traffic signal; and completing the pending transaction in a case the signal is at least one of green and yellow until after the vehicle passes by the traffic signal.

7. The method of claim 6 further comprising:

sending the command to the TSC only in a case the required threshold the vehicle identifier EV must exceed includes at least one of an EV and a cumulative EV of an at least one conflicting approach direction of the junction during at least a portion of the approximate travel time.

8. The method of claim 6 further comprising:

sending the command to the TSC only in a case a Vehicle Miles Traveled (VMT) condition of the vehicle is met.

9. The method of claim 6 further comprising:

sending the command to the TSC only in a case the traffic signal is located at a junction that is on a route defined by a navigation system connected to and in use with the vehicle identifier.

* * * * *